(No Model.) 2 Sheets—Sheet 2.
F. RADEMACHER.
POWER TRANSMITTING DEVICE.
No. 558,835. Patented Apr. 21, 1896.
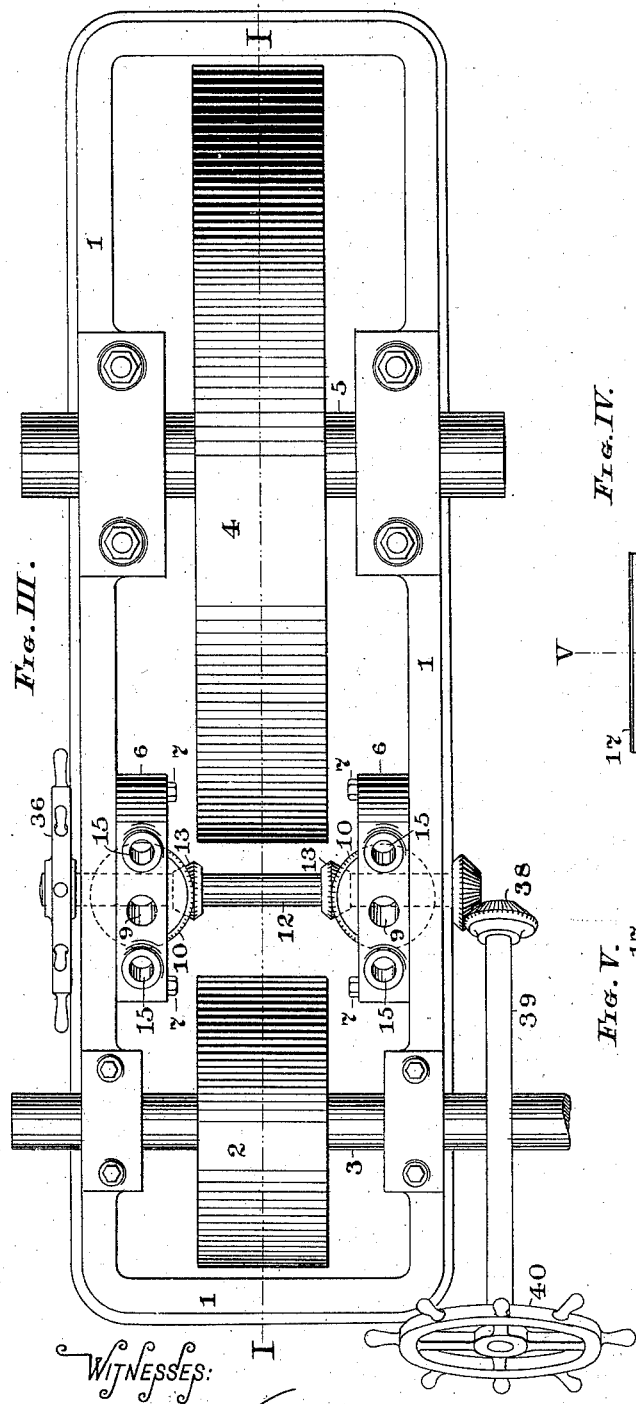
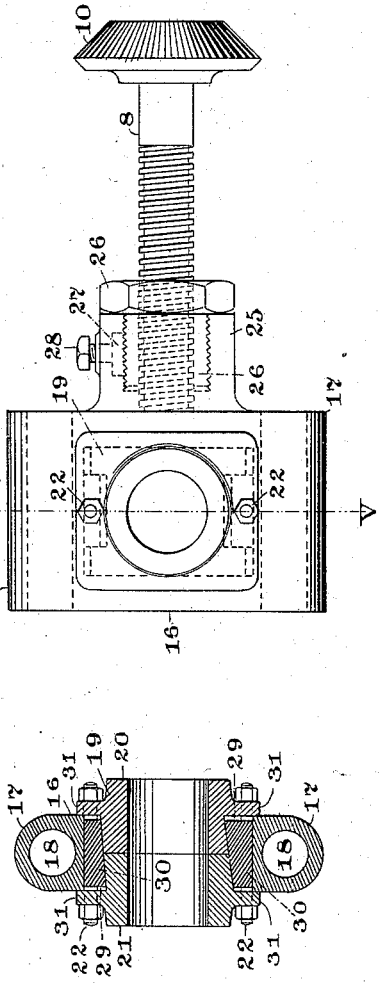
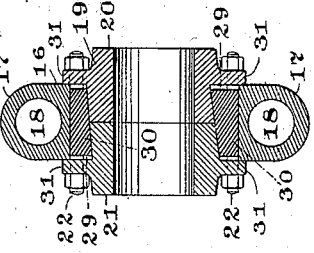
WITNESSES:
Frank Van Vleck
Geo W. LeSage
INVENTOR
Frank Rademacher
BY Knight Bros.
ATTORNEYS
ANDREW B.GRAHAM, PHOTO-LITHO. WASHINGTON, D.C.

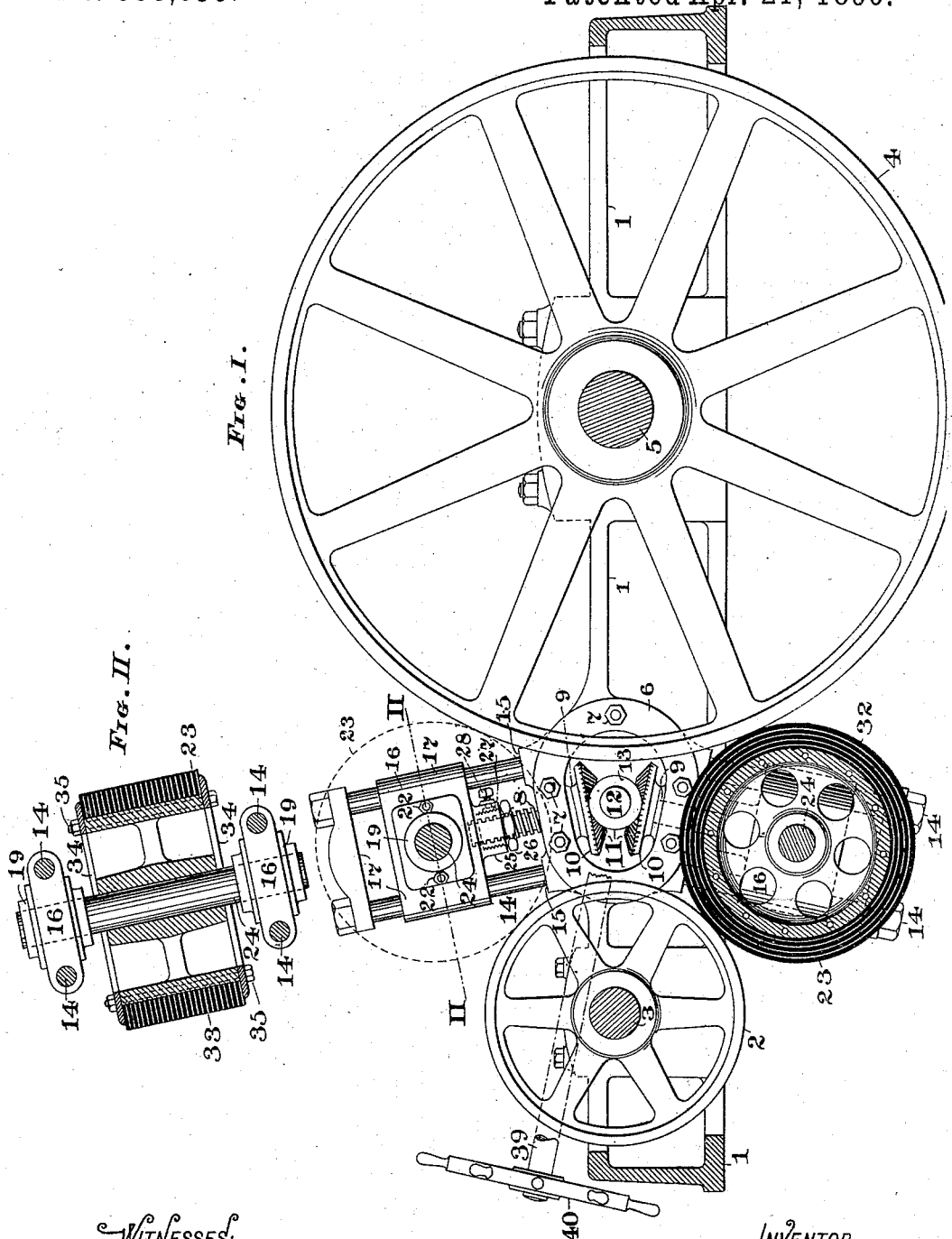

UNITED STATES PATENT OFFICE.

FRANK RADEMACHER, OF LOS ANGELES, CALIFORNIA, ASSIGNOR OF ONE-HALF TO JOSEPH MAIER AND GEORGE ZOBELEIN, OF SAME PLACE.

POWER-TRANSMITTING DEVICE.

SPECIFICATION forming part of Letters Patent No. 558,835, dated April 21, 1896.

Application filed November 25, 1895. Serial No. 570,106. (No model.)

*To all whom it may concern:*

Be it known that I, FRANK RADEMACHER, a citizen of the United States, and a resident of Los Angeles, in the county of Los Angeles and State of California, have invented certain new and useful Improvements in Power-Transmitting Devices, of which the following is a full, clear, and exact description, reference being had to the accompanying drawings, which form a part of this specification.

My invention relates to an improved device for transmitting power by friction; and my invention consists in certain features of novelty hereinafter described and claimed.

Figure I represents a vertical section taken on line I I of Fig. III, with the upper friction-pulley removed. Fig. II is a transverse section taken on line II II, Fig. I. Fig. III is a top view with friction-pulleys removed. Fig. IV is an enlarged detail view of adjustable bearing-block and operating-screw. Fig. V represents a transverse section of bearing-block, taken on line V V, Fig. IV.

Referring to the drawings, 1 represents a suitable bed-plate or support; 2, a drive-pulley located on a drive-shaft 3, said shaft having a suitable support, such as the bed-plate 1. The drive-shaft may be connected with suitable driving mechanism. (Not shown.)

4 represents a pulley to which the power is to be transmitted, said pulley being mounted upon a shaft 5, journaled in the bed-plate 1.

6 represents yokes removably secured to each side of the bed-plate by means of bolts 7.

8 represents screws which are journaled near their inner ends to the top and bottom of the yokes 6, as shown at 9.

10 represents bevel-gears on the inner ends at the screws 8, said gears being partly located in the space 11 in the center of the yokes 6.

12 represents a shaft extending from side to side of the bed-plate, and having bevel-pinions 13 thereon, which mesh with the bevel-gears 10.

14 represents guide-bolts secured at 15 to the top and bottom of the yokes 6, said bolts extending, respectively, upwardly and downwardly in an inclined position as regards the bed-plate.

16 represents adjustable bearing-blocks mounted upon the bolts 14, said blocks having ears 17, with orifices 18, through which the bolts 14 extend.

19 represents brasses formed of two parts 20 21, said brasses being adjustably secured to the blocks 16 by means of bolts 22.

23 represents the friction-pulleys for transmitting power from the drive-pulley 2 to the driven pulley 4, said friction-pulleys being mounted on shafts 24, the ends of the shafts 24 being journaled in the brasses 19.

25 represents bosses on the inner ends of the bearing-blocks 16, said bosses being screw-threaded on their inner sides.

26 represents a combined nut and sleeve, which is screw-threaded on its inner side and screwed onto the screws 8, said sleeve being also threaded on its outer side and screwed into the bosses 25.

The combined nut and sleeve which is used for adjusting the bearing-blocks vertically is locked in its position in the boss, when the proper adjustment has been made, by means of a toothed plate 27, engaging the thread on the sleeve, said plate being held in position by means of a set-screw 28.

The brasses 19 are provided with wedge-shaped apertures 29, in which are located wedge-shaped keys 30, said keys being integral with the bolts 22. The brasses 19 being formed of two parts, the wedges are easily inserted in the apertures, the ends of the apertures being covered by means of flanges 31 on the brasses through which the bolts 22 extend. By adjusting the bolts 22 the keys 30 cause the brasses 19 to move laterally, thus adjusting the friction-pulleys in a lateral direction.

The friction-pulleys 23 may have any suitable covering, such as leather or other material, and the covering may be placed flat, as shown at 32 in Fig. I, or on its edge, as shown at 33 in Fig. II. As shown in Fig. II, the covering is held in place on the pulley by means of end disks 34, connected by bolts 35.

On one end of the shaft 12 is a hand-wheel 36 and on the other end a bevel-pinion 37, the pinion 37 meshing with a pinion 38 on the inner end of a shaft 39.

40 represents a hand-wheel on the outer end of the shaft 39.

In operation, when it is desired to transmit power from the drive-pulley 2 to the pulley 4, the operator turns either of the hand-wheels 36 or 40 in the proper direction to give a forward motion to the shaft 12, which, through its connections, turns the screws 8 in the proper direction to force the upper and lower bearing-blocks 16 toward each other, said blocks carrying with them the friction-pulleys 23, said pulleys being so adjusted as to first come in contact with the drive-pulley 2, and being set in motion. Then by a slight additional movement of the hand-wheel the revolving friction-pulleys are thrown into contact with the pulley 4 and a smooth but positive motion is imparted to the same. Reversing the movement of the hand-wheels will of course throw the pulleys out of engagement.

By the adjusting means described the friction-pulleys can be so adjusted before being thrown into operation that there may be no uneven wear or slipping of any of the bearing-surfaces of the various pulleys.

I claim as my invention—

1. The combination with a drive-pulley and a driven pulley, of upper and lower friction-pulleys, movable bearing-blocks to which the friction-pulleys are journaled, bosses on the bearing-blocks, a combined adjusting nut and sleeve adapted to screw into the bosses, operating-screws adapted to screw into the nut and sleeve, the bed-plate having means for supporting the operating-screws, and means for rotating the operating-screws substantially as set forth.

2. The combination with a drive-pulley and a driven pulley, of upper and lower friction-pulleys, movable bearing-blocks to which the friction-pulleys are journaled, an adjusting-sleeve adapted to screw into the bearing-blocks, a toothed plate and set-screw for fixing the adjusting-sleeve, screws for moving the bearing-blocks, the bed-plate having means for supporting the operating-screws, and means for rotating the operating-screws substantially as set forth.

3. The combination with a drive-pulley and a driven pulley, of upper and lower friction-pulleys, movable bearing-blocks, two-part brasses secured to the bearing-blocks, wedge-shaped apertures in the brasses, and wedge-shaped keys located in the apertures for adjusting the brasses laterally, substantially as set forth.

4. The combination with a drive-pulley and a driven pulley, of upper and lower friction-pulleys, movable bearing-blocks, guide-bolts on which the blocks move, brasses secured to the bearing-blocks, wedge-shaped apertures in the brasses, wedge-shaped keys located in the apertures and connected with adjusting-bolts, and flanges on the brasses for closing the ends of the apertures, substantially as set forth.

5. The combination, with a drive-pulley and a driven pulley, of a support to which the pulleys are journaled, yokes movably secured to said support, guide-bolts secured to the yokes, bearing-blocks adapted to be moved on the guide-bolts, friction-pulleys journaled in the blocks, screws supported by the yokes and engaging the bearing-blocks, bevel-gears on the screws, a shaft having bevel-pinions thereon adapted to mesh with the bevel-gears on the screws, and a hand-wheel for turning said shaft, substantially as set forth.

6. The combination with a drive-pulley and a driven pulley, of upper and lower friction-pulleys, bearing-blocks to which the pulleys are journaled, screws for moving the bearing-blocks, bevel-gears on the screws, a shaft having bevel-pinions thereon adapted to mesh with the bevel-gears on the screws, bevel-pinion 37 on the end of the shaft, a shaft 39 having a bevel-pinion 38 on its inner end and a hand-wheel 40 on its outer end, substantially as set forth.

FRANK RADEMACHER.

Witnesses:
E. W. LITTLE,
JAS. E. KNIGHT.